United States Patent Office 3,116,323
Patented Dec. 31, 1963

3,116,323
BIS-(α-HYDROXY-α-ARYLAMINOACETYL)-
ARYL-DERIVATIVES
Guido Cavallini and Elena Massarani, Milan, Italy,
assignors to Francesco Vismara S.p.A., Casatenovo
(Como), Italy, a firm
No Drawing. Filed Apr. 18, 1961, Ser. No. 103,721
Claims priority, application Italy Apr. 27, 1960
6 Claims. (Cl. 260—471)

This invention relates to novel bis-(α-hydroxy-α-aryl-aminoacetyl)-aryl derivatives having antiviral activity, particularly against influenza virus (PR$_8$), heptatitis virus (MHV$_3$), Herpes simplex, Coxsackie virus, adenovires, Carfe virus, distemper virus, neutrotropic virus (CLM), Newcastle disease virus, Echo virus and hemadsorption virus.

The compounds of this invention are represented by the following general formula:

FORMULA I

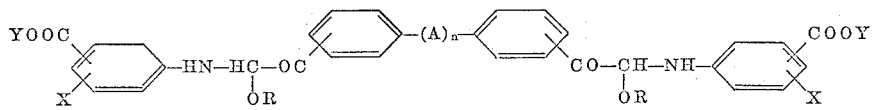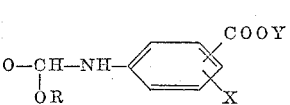

in which:

A represents oxygen, sulfur, sulfinyl, sulfonyl, methylene, ethylene, α,β-diethylethylene, vinylene, or α,β-diethylvinylene, and wherein $n$ is an integer from 0 to 1;
R represents hydrogen or a hydrocarbon radical of from 1 to 12 carbon atoms, inclusive;
X represents hydrogen, hydroxy, methoxy or acetoxy; and
Y represents hydrogen or lower alkyl of from 1 to 4 carbon atoms, inclusive.

Advantageous compounds of this invention are represented by the following general formula:

FORMULA II

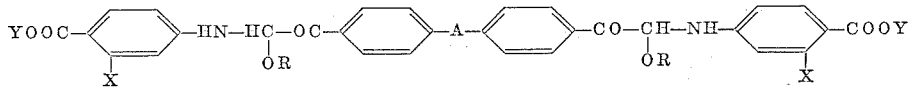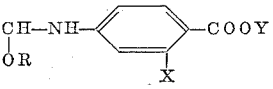

in which:

A represents oxygen, sulfur, sulfonyl, ethylene, vinylene or a single direct valence bond;
R represents hydrogen, a lower saturated or unsaturated aliphatic hydrocarbon radical of from 1 to 8 carbon atoms, inclusive, cyclohexyl or benzyl;
X represents hydrogen or hydroxy; and
Y represents hydrogen, methyl or ethyl.

Preferred compounds of this invention are represented by Formula II above when A is similarly defined, R is hydrogen or lower alkyl of from 1 to 8 carbon atoms, inclusive, particularly methyl or ethyl, and X and Y are hydrogen.

The novel bis-(α-hydroxy-α-arylaminoacetyl)-aryl derivatives of Formula I are prepared by condensing the hydrate or alcoholate addition compound of a bis glyoxal having the following formula:

FORMULA III

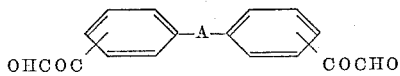

in which A is as defined above for Formula I, with an acid having the following formula:

FORMULA IV

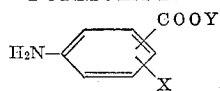

in which X and Y are as defined above for Formula I.

The condensation is carried out by treating the calculated amount of a glyoxal of Formula III and an acid of Formula IV in the presence of a suitable solvent. The solvent used is generally of the alcoholic or ether type, depending on the desired final products. In fact, reacting the glyoxal hydrate in an organic reaction solvent which is not alcoholic and in particular is an inert solvent, such as for example benzene, toluene, xylene, dioxane, cyclohexane or other similar ones, the compounds of Formula I in which R represents hydrogen are obtained. Using instead an alcoholic solvent ROH, the compounds of Formula I in which R represents a hydrocarbon radical, and precisely the residue of the alcohol used, are obtained.

By condensing the glyoxal alcoholate the compounds of Formula I in which R represents a hydrocarbon radical are obtained. In this case however it is advantageous to use an alcohol solvent corresponding to the alcoholate used. Thus for example if the alcoholate starting material is the glyoxal methylate it is preferred to run the reaction in the presence of methyl alcohol.

The condensation reaction is carried out at a temperature from about ambient or room temperature to the boiling point of the solvent used. The reaction time is from about 15 minutes to 24 hours depending on the temperature and the chemical nature of the reagents, but preferably is from about 30 minutes to eight hours at a temperature from about 40 to 100° C.

The condensation products are usually isolated from the reaction mixture by cooling directly or first removing the major portion of the solvent and then cooling, filtering the precipitate and recrystallizing from an appropriate solvent.

The glyoxal starting materials of Formula III are prepared by selenium dioxide oxidation of corresponding methyl ketones (which are in turn prepared by standard Friedel-Crafts acylation) or by treating corresponding dihalogen derivatives with an alkali metal alcoholate followed by acid hydrolysis. More complete methods for the preparation of these starting materials are described in copending Serial No. 41,765, filed July 11, 1960.

The following examples illustrate the compounds embraced by general Formula I and as exemplary are not intended to limit the scope of the invention broadly defined herein.

Example 1

A solution of 2.72 g. of 4,4'-biphenylylbisglyoxal hydrate in 50 cc. of anhydrous ethyl alcohol is heated at 60° C. and 3.3 g. of ethyl p-aminobenzoate is added. The mixture is maintained at 60° C. for four hours with stirring and then part of the solvent is evaporated by distillation. Cooling separates 4,4'-bis-[α-ethoxy-α-(p-carbethoxyphenylamino)-acetyl]-biphenyl, M.P. 166–167° C. (dec.).

Example 2

To a solution of 2.72 g. of 4,4'-biphenylylbisglyoxal hydrate in 50 cc. of dioxane heated to about 70° C. is added 3 g. of p-aminobenzoic acid. The mixture is heated at reflux for five hours with stirring and then cooled and filtered to yield 4,4'-bis-[α-hydroxy-α-(p-carboxyphenylamino)-acetyl]-biphenyl.

Operating under the same conditions and condensing 4,4'-biphenylylbisglyoxal hydrate with o- and m-aminobenzoic acid, yields respectively 4,4'-bis[α-hydroxy-α-(o-carboxyphenylamino)-acetyl]-biphenyl and 4,4'-bis-[α-hydroxy-α-(m-carboxyphenylamino)-acetyl]-biphenyl.

Example 3

4,4'-biphenylylbisglyoxal hydrate (2.72 g.) is dissolved at 60° C. in 50 cc. of anhydrous isopropyl alcohol and to this solution is added 3.3 g. of ethyl p-aminobenzoate. The mixture is maintained at 60° C. for five hours with stirring, then cooled and the precipitate separated by filtration to give 4,4'-bis-[α-isopropoxy-α-(p-carbethoxyphenylamino)-acetyl]-biphenyl, M.P. 164° C. (dec.).

Following the method described above and using instead benzyl alcohol yields 4,4'-bis-[α-benzyloxy-α-(p-carbethoxyphenylamino)-acetyl]-biphenyl.

Example 4

To a solution of 2.5 g. of 4,4'-biphenylylbisglyoxal in 50 cc. of anhydrous isoamyl alcohol is added 3.3 g. of ethyl p-aminobenzoate. The mixture is allowed to stand at ambient temperature for about 20 hours and then the product is filtered off to give 4,4'-bis-[α-isoamyloxy-α-(p-carbethoxyphenylamino)-acetyl]-biphenyl, M.P. 156–157° C. (dec.).

Operating under conditions described above and substituting isoamyl alcohol with cyclohexanol yields 4,4'-bis-[α-cyclohexyloxy-α-(p-carbethoxyphenylamino)-acetyl]-biphenyl.

Example 5

To 3.1 g. of 4,4'-biphenylylbisglyoxal hydrate in 50 cc. of propargyl alcohol is added 3.3 g. of ethyl p-aminobenzoate. The mixture is heated at reflux for two hours, part of the solvent is then removed and the remainder cooled to give a precipitate of 4,4'-bis-[α-propargyloxy-α-(p-carbethoxyphenylamino)-acetyl]-biphenyl.

Operating under the conditions described above and substituting the propargyl alcohol with allyl alcohol yields 4,4'-bis-[α-allyloxy-α-(p-carbethoxyphenylamino)-acetyl]-biphenyl.

Example 6

3.2 g. of 4,4'-bisglyoxalyldiphenylether hydrate is dissolved with heating in 60 cc. of anhydrous ethanol and to the solution is added 2.8 g. of p-aminobenzoic acid in 50 cc. of ethanol. The mixture is heated at 60° C. for four hours and then cooled to yield 4,4'-bis-[α-ethoxy-α-(p-carboxyphenylamino)-acetyl]-diphenylether, M.P. 261–262° C. (dec.).

Example 7

6.4 g. of 4,4'-bisglyoxalyldiphenylether hydrate is heated at 60° C. for two hours with 100 cc. of anhydrous dioxane. To the mixture is added 5.6 g. of p-aminobenzoic acid in 60 cc. of dioxane and heating is continued for another four hours. Cooling precipitates 4,4'-bis-[α-hydroxy-α-(p-carboxyphenylamino)-acetyl]-diphenylether, M.P. 259–260° C. (dec.).

Example 8

3.38 g. of 4,4'-bisglyoxalyldiphenylethane hydrate is dissolved with heating in 70 cc. of anhydrous ethanol and to the solution is added 2.8 g. of p-aminobenzoic acid in 50 cc. of ethanol. Following the procedure of Example 6 yields 4,4'-bis-[α-ethoxy-α-(p-carboxyphenylamino)-acetyl]-diphenylethane.

Example 9

A solution of 3.35 g. of 4,4'-bisglyoxalyldiphenylsulfide hydrate in 100 cc. of anhydrous dioxane is treated with a solution of 2.8 g. of p-aminobenzoic acid in 50 cc. of dioxane following the procedure described in Example 7 to give 4,4'-bis-[α-hydroxy-α-(p-carboxyphenylamino)-acetyl]-diphenylsulfide.

Example 10

3.2 g. of 2,2'-bisglyoxalyldiphenylether hydrate is dissolved with heating in anhydrous ethanol and to the solution is added 2.8 g. of methyl p-aminosalicylate. The mixture is heated at 60° C. for four hours and worked up as in Example 6 to give 2,2'-bis-[α-ethoxy-α-(3-hydroxy-4-carbomethoxyphenylamino)-acetyl]-diphenylether.

Example 11

3.3 g. of 4,4'-bisglyoxalylstilbene hydrate is dissolved with heating in 70 cc. of anhydrous methanol and to the solution is added 2.8 g. of p-aminobenzoic acid dissolved in 30 cc. of methanol. Heating is continued at 60° C. for another two hours. Working up as described in Example 6 yields 4,4'-bis-[α-methoxy-α-(p-carboxyphenylamino)-acetyl]-stilbene.

Example 12

4.7 g. of 4,4'-bisglyoxalyldiphenylsulfone hydrate is dissolved with heating in 70 cc. of methanol and to the solution is added 3.9 g. of p-aminoacetylsalicylic acid in 50 cc. of methanol. Heating is continued at 60° C. for five hours and then worked up as described in Example 6 to give 4,4'-bis-[α-methoxy-α-(3-acetoxy-4-carboxyphenylamino)-acetyl]-diphenylsulfone.

Example 13

A solution of 3.1 g. of 3,3'-bisglyoxalyldiphenylether hydrate in 70 cc. of dioxane is treated at 60° C. for four hours with 2.8 g. of p-aminobenzoic acid in 50 cc. of dioxane. Working up according to the method of Example 7 gives 3,3'-bis-[α-hydroxy-α-(p-carboxyphenylamino)-acetyl]-diphenylether.

Example 14

A solution of 7.7 g. of 2,2'-bisglyoxalyldiphenylsulfide hydrate in 100 cc. of anhydrous ethanol is treated for three hours at 60° C. with a solution of 3.4 g. of 4-amino-2-methoxybenzoic acid in 50 cc. of ethanol. Working up as described in Example 6 yields 2,2'-bis-[α-ethoxy-α-(3-methoxy-4-carboxyphenylamino)-acetyl]-diphenylsulfide.

Example 15

3.2 g. of 4,4'-bisglyoxalyldiphenylmethane hydrate dissolved with heating in 70 cc. of anhydrous ethanol is treated with 2.8 g. of p-aminobenzoic acid in 50 cc. of ethanol. Following the method described in Example 6 yields 4,4'-bis-[α-ethoxy-α-(p-carboxyphenylamino)-acetyl]-diphenylmethane.

Example 16

3.6 g. of 4,4'-bisglyoxalyldiphenylsulfoxide hydrate is heated at 60° C. for two hours with isopropyl alcohol. This solution is treated with 1.38 g. of anthranilic acid in 25 cc. of isopropyl alcohol and heating is continued for two hours. Cooling the solution yields 4,4'-bis-[α-isopropoxy-α-(2-carboxyphenylamino)-acetyl]-diphenylsulfoxide.

Similarly, employing n-butyl alcohol in the above reaction sequence gives the corresponding 4,4'-bis-[α-butoxy-α-(2-carboxyphenylamino)-acetyl]-diphenylsulfoxide.

Example 17

A solution of 4.0 g. of 4,4'-bisglyoxalyl-α,β-diethyl-diphenylethane obtained by heating in 70 cc. of anhydrous ethanol is treated with 2.8 g. of p-aminobenzoic acid in 50 cc. of ethanol. Following the procedure of Example 6 yields 4,4'-bis-[α-epoxy-α-(p-carboxyphenylamino)-acetyl]-α,β-diethyl-diphenylethane.

Similarly, employing 3.9 g. of 4,4'-bisglyoxalyl-α,β-diethylstilbene in the above reaction furnishes the corresponding 4,4'-bis-[α-ethoxy-α-(p-carboxyphenylamino)-acetyl]-α,β-diethylstilbene.

Example 18

A mixture of 2.72 g. of 4,4'-biphenylylbisglyoxal hydrate and 60 cc. of anhydrous n-octyl alcohol in 200 cc. of anhydrous benzene is heated at reflux for 12 hours over a water trap (Org. Syn. 3, 382) having an inner funnel charged with a mixture of phosphorus pentoxide and a filter aid. Concentration of the mother liquor in vacuo gives 4,4'-biphenylylbisglyoxal n-octylate which is reacted in 150 cc. of benzene with 3 g. of p-aminobenzoic acid to

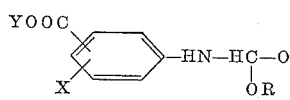

give 4,4'-bis-[α-(n-octyloxy)-α-(p-carboxyphenylamino)-acetyl]-biphenyl.

Similarly, following the above reaction sequence but employing 20 g. of citronellol instead of the n-octyl alcohol yields the corresponding citronellylate which is reacted with 3 g. of p-aminobenzoic acid to give 4,4'-bis-[α-citronellyloxy-α-(p-carboxyphenylamino)-acetyl]-biphenyl.

Example 19

Following the procedure of Example 1 but reacting 4 g. of butyl p-aminobenzoate with 2.72 g. of 4,4'-biphen-

ylylbisglyoxal hydrate in anhydrous ethyl alcohol yields 4,4' - bis-[α-ethoxy-α-(p-carbobutoxyphenylamino)-acetyl]-biphenyl.

Example 20

Following the procedure of Example 1 but reacting 2.72 g. of 4,4'-biphenylylbisglyoxal hydrate in 50 cc. of anhydrous ethyl alcohol with 3 g. of p-aminobenzoic acid yields 4,4'-bis-[α-ethoxy-α-(p-carboxyphenylamino)-acetyl]-biphenyl.

Example 21

3.02 g. of 4,4'-bisglyoxalylbiphenyl hydrate is dissolved in 50 cc. of anhydrous ethanol with heating and to the solution is added 3.6 g. of p-aminosalicylic acid. The mixture is heated at 60° C. for four hours and then cooled to yield 4,4'-bis-[α-ethoxy-α-(3-hydroxy-4-carboxyphenylamino)-acetyl]-biphenyl.

Similarly, 4,4'-bisglyoxalyldiphenylether hydrate is reacted with p-aminosalicylic acid to give the corresponding 4,4' - bis-[α-ethoxy-α-(3-hydroxy-4-carboxyphenylamino)-acetyl]-diphenylether.

What is claimed is:

1. A chemical compound of the formula:

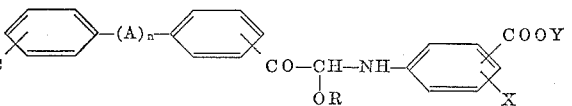

in which A is a member selected from the group consisting of oxygen, sulfur, sulfinyl, sulfonyl, methylene, ethylene, α,β-diethylethylene, vinylene and α,β-diethylvinylene, and wherein $n$ is an integer from 0 to 1 bond; R is a member selected from the group consisting of hydrogen, aliphatic hydrocarbon of from 1 to 12 carbon atoms, cyclohexyl and benzyl; X is a member selected from the group consisting of hydrogen, hydroxy, methoxy and acetoxy; and Y is a member selected from the group consisting of hydrogen and lower alkyl of from 1 to 4 carbon atoms.

2. A chemical compound of the formula:

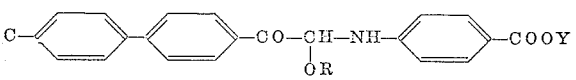

in which R is lower alkyl of from 1 to 8 carbon atoms and Y is lower alkyl of from 1 to 4 carbon atoms.

3. A chemical compound of the formula:

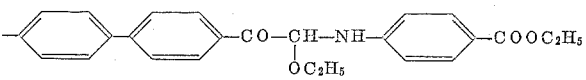

4. A chemical compound of the formula:

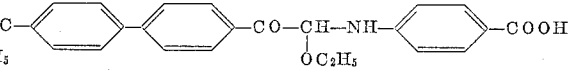

5. 4,4' - bis-[α-ethoxy-α-(p-carboxyphenylamino)-acetly]-diphenylether.

6. 4,4' - bis-[α-ethoxy-α-(p-carboxyphenylamino)-acetyl]-diphenylethane.

References Cited in the file of this patent

Cavallini et al.: J. Med. Pharm. Chem., 2, No. 1, 99–106 (1960).